United States Patent [19]
Posey-Dowty et al.

[11] Patent Number: 5,994,530
[45] Date of Patent: *Nov. 30, 1999

[54] CARBOXYALKYL CELLULOSE ESTERS FOR USE IN AQUEOUS PIGMENT DISPERSIONS

[75] Inventors: Jessica Dee Posey-Dowty; Alan Kent Wilson, both of Kingsport; Larry Gerald Curtis, Johnson City, all of Tenn.; Paul Michael Swan, Lancashire, United Kingdom; Kab Sik Seo, Kingsport, Tenn.

[73] Assignee: Eastman Chemical Corporation, Kingsport, Tenn.

[ * ] Notice: This patent is subject to a terminal disclaimer.

[21] Appl. No.: 09/104,958

[22] Filed: Jun. 25, 1998

[51] Int. Cl.$^6$ ............................... C08B 13/00; C08L 1/00
[52] U.S. Cl. ................................. 536/66; 524/35; 524/37; 524/38; 524/39; 524/40; 524/42; 524/43; 524/44; 524/45; 106/163.01; 106/102.8

[58] Field of Search .................................. 536/66; 524/35, 524/37, 38, 39, 40, 42, 43, 44, 45; 106/163.01, 102.8

[56] References Cited

U.S. PATENT DOCUMENTS 5,668,273  9/1997  Allen et al. ............................... 536/66

*Primary Examiner*—Elli Peselev
*Attorney, Agent, or Firm*—Rose M. Allen; Harry J. Gwinnell

[57] ABSTRACT

The present invention provides certain carboxymethyl cellulose (CMC) esters of higher acids (e.g., CMC acetate propionate, CMC propionate, CMC acetate butyrate, and CMC butyrate)having specific use in aqueous dispersions useful in formulating waterborne coating compositions containing pigments, especially metallic pigments such as aluminum flakes and mica. The esters also have specific use as wetting agents and in high solids coatings.

28 Claims, No Drawings

CARBOXYALKYL CELLULOSE ESTERS FOR USE IN AQUEOUS PIGMENT DISPERSIONS

FIELD OF THE INVENTION

This invention belongs to the field of cellulose chemistry. In particular, it relates to certain esters of carboxy(alkyl) cellulose and their use in aqueous pigment dispersions and coatings made therefrom.

BACKGROUND OF THE INVENTION

Cellulose esters are valuable polymers, which are useful in many plastic, film, coating and fiber applications. In coatings applications, cellulose esters are generally applied from organic solvent solutions.

U.S. Pat. No. 4,520,192 describes a process for preparing carboxyalkyl acetyl celluloses with a carboxyalkyl degree of substitution per anhydroglucose unit (DS) of 0.2–2.5 and an acetyl DS of 0.5–2.8 and the metal salts of these materials. The preparation of the carboxyalkyl acetyl cellulose is accomplished by converting carboxyalkyl cellulose, sodium salt, into its acid form by soaking in an aqueous acid solution of sulfuric acid, hydrochloric acid, nitric acid, or acetic acid. This is followed by washing with water, solvent exchange of the water with acetic acid, and reaction with acetic anhydride in the presence of a catalyst (sulfuric acid, perchloric acid, sulfoacetic acid or zinc chloride) to give a trisubstituted carboxy acetyl cellulose, i.e., carboxymethyl cellulose acetate, upon precipitation into water. They also claim a process for converting the carboxyalkyl acetyl cellulose product (acid form) to its corresponding sodium, potassium, calcium, or ammonium carboxylate salt. The acid forms of the trisubstituted carboxyalkyl acetyl celluloses were insoluble in water and aqueous lower chain alcohol solutions. These materials were soluble in acetone and methylene chloride/ethanol 9/1. The sodium salt of the carboxyalkyl acetyl cellulose was soluble in water, an aqueous lower alkyl alcohol containing a large amount of water, or aqueous acetone; however, it was insoluble in methylene chloride/ethanol 9/1. We believe this process to yield a product containing an unneutralized strong acid with high sulfur levels. Consequently, this ester would be unstable under general drying conditions or other heat treatment. The process for converting the sodium salt form of carboxymethyl cellulose to the acid form is also described in Swiss Patent No. 247,440 by soaking in 10% sulfuric acid solution.

U.S. Pat. No. 3,435,027 describes a base catalyzed (sodium hydroxide) esterification of carboxymethyl cellulose (in the sodium salt form) in 70–85% acetone nonsolvent media with acetic, propionic, lactic, or stearyl anhydride. The procedure yields a product with a low degree of ester substitution and falls well short of a fully substituted cellulose. This reference claims a base catalyzed process for preparing cellulose ether-esters (containing from 0.1–18% acetyl, which corresponds to 0.01–0.97 DS (acetyl) from a water soluble cellulose ether in a nonsolvent media and products thereof.

USSR Patent 612933 describes a process for preparation of cellulose acetate ethers wherein an alkali activated cellulose (12% sodium hydroxide) is etherified with monochloroacetic acid followed by esterification with acetic anhydride in the presence of sulfuric acid catalyst. The process is limited to a low DS of the carboxymethyl substituent.

U.S. Pat. No. 3,789,117 discloses a process for preparing an enteric medicament coating from an organic solvent soluble cellulose derivative. The cellulose derivative's substitution has a carboxymethyl DS range of 0.3 to 1.2 in conjunction with at least one of the remaining hydroxyl groups being etherified or esterified. Ester groups, of which they do not indicate the degree of substitution, include acetyl, propionyl, butyryl, nitric, or higher fatty acids.

RO 96929 describes a carboxymethyl cellulose (CMC) acetate with a carboxymethyl degree of substitution of 0.5–3.0, acetyl DS of 0.4–2.9, and viscosity 150–1500 cP. This material was taught to be useful as an alkaline suspension stabilizer, solution thickener, and alkaline media binder. The material was prepared by mixing 70% acetic acid with CMC(Na salt), washing the acetic wet CMC with 50% acetic acid to remove the sodium acetate, and esterification of the acetic acid wet CMC—H with acetic anhydride for 1.5 hours at 50–110° C. in the presence of sulfuric acid.

U.S. Pat. No. 5,008,385 reports cellulose derivatives that can be synthesized by homogeneous reaction in dimethylacetamide and/or N-methylpyrrolidine containing LiCl. Included in their examples was CMC acetate (carboxymethyl DS 0.13–0.23, acetyl DS 2.54–2.15). These materials were tested for use in the production of fibers, filaments, or membranes.

Carbohydrate Research, 13, pp.83–88, (1970) describes the preparation of CMC acetate by sulfuric acid catalyzed acetylation of CMC (carboxymethyl DS of 0.07) hydrolysis (acetylation and hydrolysis procedures taken from Maim, Ind. Eng. Chem., 38 (1946) 77), and evaluation of this material in membranes for reverse osmosis.

Holzforschung, 27(2), pp. 68–70, (1973) describes the rate of carboxymethylation and deacetylation of cellulose acetate in the presence of sodium hydroxide. This work showed that deacetylation and carboxymethylation occur simultaneously with the rate of deacetylation being faster than the rate of carboxymethylation. The highest carboxymethyl DS obtained was less than 0.1.

GB 2,284,421 discloses carboxymethyl cellulose alkanoates which are "lightly carboxymethylated", i.e., having a degree of substitution per anhydroglucose unit of less than 0.2. Such polymers are taught to be useful as a coating agent for paper and papermaking or as a bonding agent for non-woven fabric, or can be extruded to form filaments or film, or can be used to produce shaped articles or a sponge.

Numerous patents mention the use of polymer coatings on the surface of pigments to either protect the surface of the pigments from reaction or to prevent agglomeration of the pigment particles. Elaborate means are taken to prevent the agglomeration of pigment particles in both solvent and waterborne dispersions. For example, U.S. Pat. No. 5,558,705 teaches binding organic pigments with metallic pigments and polymeric materials to prevent agglomeration. However, no mention is made of aqueous pigment dispersions.

Similarly, U.S. Pat. No. 4,725,317 suggests the use of pigments, polymeric binders, and organic solvents to form a solvent free, free-flowing metallic pigment or pigment composition which is non-dusting. This is achieved by coating the pigment particles followed by evaporating the solvents. Polymeric binders such as cellulose esters, cellulose ethers, acrylic ester resins, polyester resins, alkyd resins, etc. are mentioned. However, the patent teaches that metallic particles or pigments must be dried with the coating on the surface in order to add the pigments to water. By adding additional steps in processing, the cost of manufacturing increases. Furthermore, it may be desirous to use pigments or particles that have not been manufactured in such a process, due to the limited availability of pigments processed in the above manner.

Research Disclosure 40055 discusses polished spherical aluminum pigments that can be easily dispersed in solvents without agglomerating, due to their spherical shape. They can be added to a polymer system with minimal shear. However, because the aluminum particles are spheres rather than flat disks or similar shape, they cannot contribute to metallic flake orientation or metallic flop. Therefore, the spheres must be added with other aluminum flakes to achieve brightness or improved flop. U.S. Pat. No. 5,593,773 mentions new shapes of particles to provide better metallic flop and orientation. Metallic flop and orientation are also described in U.S. Pat. No. 4,590,235. The patent does not mention the use of binders, particularly those that enable metallic flake to beincorporated into aqueous systems.

It is known in the art that it is necessary to passivate or coat aluminum pigment particles to prevent reaction with water to form hydrogen gas when such particles are used in an aqueous system. Although GB 2,185,936 discloses a method for coating aluminum by a blown film procedure to manufacture a metal polymer film laminate, it does not mention any improvement in wetting of the aluminum in aqueous systems. EP 0 673 980 A states that lamination of aluminum film can be used to form "glitter" or "flitter" flakes by cutting the aluminum film. Delamination in such a procedure can be a problem in the preparation of metallic flake pigments. European Patent Application 134,676 teaches that heating metallic flake particles in the presence of an oxygenated atmosphere followed by coating with polyethylene wax protects the surface. No mention is made in either reference, of adding a polymeric binder resin to improve the wetting of the metallic flake. U.S. Pat. No. 5,637,143, suggests the protection of the surface of metal particles with heteropolyanion compounds, and phosphosilicate compounds to increase their stability against attack by water.

Prevention of agglomeration of metallic particles in the art is usually achieved by dilution of the metallic particles with solvents. However, in aqueous coatings, there stands a desire to reduce the amount of volatile organic solvents, without having to go to elaborate methods of specially coating aluminum flake or pigments in order for them to disperse easily in aqueous systems.

SUMMARY OF THE INVENTION

The present invention provides ether-ester derivatives of cellulose which combines a carboxyalkyl ether (preferably carboxymethyl) substituent and propionyl, acetyl/propionyl, butyryl, or acetyl/butyryl ester substituents. These new carboxymethyl cellulose esters (CMC esters) have a high combined degree of substitution (DS) per anhydroglucose unit on the cellulose backbone of ether and ester functions in the trisubstituted or partially hydrolyzed form (generally <0.70 DS hydroxyl). These new CMC esters are soluble in a wide range of organic solvents which allows coating formulators a wider latitude of solvent choice. They are readily dispersed in waterborne formulations when treated with ammonia or an amine and exhibit unusual rheological properties illustrated by an exponential increase in viscosity with a small increase in concentration of CMC ester. This property is beneficial in formulating waterborne coatings. These materials exhibit superior compatibility when blended with other coatings resins thereby yielding clear films with a wider range of coatings resins than do conventional cellulose esters.

The invention also provides aqueous dispersions of carboxymethyl cellulose esters and pigments, especially metallic flake, which have simply been passivated or contain some solvent but are not necessarily coated with a binder.

The carboxymethyl cellulose esters of the present invention may also be useful as wetting agents and in the preparation of high solids coatings.

DETAILED DESCRIPTION OF THE INVENTION

The present invention provides certain esters of carboxy ($C_1$–$C_3$ alkyl) cellulose, which are useful as components of coating compositions. Such esters preferably have an inherent viscosity of 0.20 to 1.7 dL/g, as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7. As is described below, these resins are useful in coating and ink formulations. Certain particular novel esters are preferred and are further provided as additional embodiments of this invention as follows.

In one such embodiment of the present invention, there is provided a carboxymethyl cellulose butyrate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 1.7 dL/g, as measured in a 60/40 (wt./wt.) solution of phenol/tetrachloroethane at 25° C.

As a further preferred embodiment, there is provided a carboxymethyl cellulose propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 1.70 dL/g, as measured in a 60/40 (wt./wt.) solution of phenol/tetrachloroethane at 25° C.

As a further embodiment, there is provided a carboxymethyl cellulose acetate butyrate having a degree of substitution of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 1.70 dL/g, as measured in a 60/40 (wt./wt.) solution of phenol/tetrachloroethane at 25° C. It is preferred that the degree of substitution per anhydroglucose unit of hydroxyl is 0.10 to 0.70, butyryl is 1.10 to 2.55, and acetyl is 0.10 to 0.90.

As a further embodiment, there is provided a carboxymethyl cellulose acetate propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65, and having an inherent viscosity of 0.20 to 1.70 dL/g, as measured in a 60/40 (wt./wt.) solution of phenol/tetrachloroethane at 25° C. It is preferred that the degree of substitution per anhydroglucose unit of hydroxyl is 0.10 to 0.70, butyryl is 1.10 to 2.55, and acetyl is 0.10 to 0.90.

The $C_2$–$C_4$ esters of carboxy($C_1$–$C_3$ alkyl) cellulose of the invention may be prepared by a multi-step process. In this process, the free acid form of, for example, carboxy-methyl cellulose is water activated followed by water displacement via solvent exchange with an alkanoic acid such as acetic acid followed by treatment with a higher aliphatic acid (propionic acid or butyric acid) to give a carboxymethyl cellulose (CMC—H) activate wet with the appropriate aliphatic acid. In this regard, we have found that it is of critical importance that the starting carboxymethyl cellulose be prepared from cellulose with a 95 to 99% alpha content, preferably about 96 to 97% alpha cellulose content. The high alpha content is important for the quality of the final products prepared therefrom. We have found that low alpha cellulose pulps lead to poor solubility in organic solvents and consequently poor formulations.

Next, the CMC—H is treated with the desired anhydride in the presence of a strong acid catalyst such as sulfuric acid to give a fully substituted CMC ester. A final solution (consisting of water and an aliphatic acid) is added slowly to the anhydrous "dope" solution so as to allow removal of combined sulfur from the cellulose backbone. The final addition allows a slow transition through the hydrous point to give period of low water concentration and high temperature (as a result of the exotherm from water reacting with excess anhydride) in the reaction medium. This is crucial for hydrolysis of combined sulfur from the cellulose backbone. This product is then hydrolyzed using sulfuric acid to provide a partially substituted carboxymethyl cellulose ester. Hydrolysis is necessary to provide gel free solutions in organic solvents and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of carboxy($C_1$–$C_3$ alkyl) cellulose ester are isolated by diluting the final neutralized "dope" with an equal volume of acetic acid followed by precipitation of the diluted "dope" into a volume of water about 1.5 to 3.0 times its weight. This is followed by addition of 1.5 to 3.0 volumes of water to give a particle that can be easily washed with de-ionized water to efficiently remove residual organic acids and inorganic salts. As an alternative isolation, the fully substituted or partially hydrolyzed forms of carboxy($C_1$–$C_3$ alkyl) cellulose ester are isolated by precipitation of the diluted dope by addition of about 2.0 times its volume of 10% aqueous acetic acid, followed by an additional 2.0 times the dope volume of water.

This yields a more dense particle than the former procedure which also washes efficiently.

Thus, as a further aspect of the invention, there is provided a process for preparing $C_2$–$C_4$ esters of carboxy ($C_1$–$C_3$ alkyl) cellulose having an inherent viscosity of about 0.2 to 1.70 dL/g, as measured in a 60/40 (wt./wt.) solution of phenol/tetrachloroethane at 25° C., and having a degree of substitution per anhydroglucose unit (DS/AGU) of carboxy ($C_1$–$C_3$ alkyl) of about 0.20 to 0.75, which comprises:

(a) slurrying water wet carboxy($C_1$–$C_3$ alkyl) cellulose (acid form) in a solvent selected from the group consisting of acetic acid, propionic acid, and butyric acid, and mixtures thereof, thereby dewatering said carboxy ($C_1$–$C_3$ alkyl) cellulose to form a mixture; followed by (b) treating said mixture with a compound selected from the group consisting of acetic anhydride, propionic anhydride, and butyric anhydride, and mixtures thereof, in the presence of a strong acid catalyst; followed by (c) heating at a temperature of about 40 to 55° C. until the reaction is complete, i.e., after complete dissolution of material; followed by (d) adding slowly a mixture of water, an alkanoic acid and optionally an amount of a $C_2$–$C_5$ alkanoic acid salt of an alkali or alkaline earth metal insufficient to totally neutralize the strong acid catalyst;

(e) heating said solution at a temperature of about 55 to 85° C. for about 1 to 15 hours, which effects partial hydrolysis of the carboxy($C_1$–$C_3$ alkyl) cellulose alkanoic ester;

(f) treating said solution with an equimolar amount, based on the amount of strong acid catalyst, of a $C_2$–$C_5$ alkanoic salt of an alkali or alkaline earth metal dissolved in water and an alkanoic acid.

As a preferred embodiment of this process, the reaction mixture is diluted with an equal volume of acetic acid, followed by precipitation of the diluted product into a volume of water about 1.5 to 3.0 times its weight, followed by an additional volume of water about 1.5 to 3.0 times its weight, washed with deionized water and dried to provide the desired product as a powder or granules. This powder is thus free from any significant amount of residual organic acids and inorganic salts.

As an alternative embodiment of this process, the reaction mixture is diluted with an equal volume of acetic acid, followed by precipitation of the diluted product by the addition of about 2.0 times its volume of 1-% aqueous acetic acid, followed by about 2.0 times its volume of water, washed with deionized water and dried to provide the desired product as a powder.

Contrary to the teaching in GB 2,284,421, the carboxyalkyl cellulose as obtained from alkylation is not suitable for esterification. We have found that it must be converted to the acid form, water activated, and solvent exchanged with an alkanoic acid before esterification will occur. Also contrary to this reference, we have found that carboxyalkyl celluloses having a degree of substitution of about 0.2 to 0.75 are actually less reactive than the original cellulose and thus heat must be utilized to effect esterification.

Cellulose esters have found utility in pigment dispersions by blending the cellulose ester and a pigment with heat and/or shear to disperse the pigment. In this manner, pigments can be easily dispersed in coating formulations, thereby providing high coloring power and good transparency while using a minimal amount of pigment. Such pigment dispersions can be improved by the use of the carboxy($C_1$–$C_3$ alkyl) cellulose esters of the present invention in place of conventional cellulose esters.

Mixtures of $C_2$–$C_4$ esters of carboxy($C_1$–$C_3$ alkyl) cellulose and pigments may be prepared at pigment to ester ratios of from about 10:90 to about 90:10 weight percent. In a high shear environments, such as when using organic pigments, it is preferable to use pigments in an amount from about 10 to 20 weight percent, and esters in an amount from about 90 to 80 weight percent. These dispersions may be prepared on two-roll mill, ball mill, Kady mill, sand mill mixers, and the like. For pigments requiring gentle agitation or prepared in a low shear environment, such as when using aluminum flake pigments, the pigments may be present in an amount from about 50 to 90 weight percent and the $C_2$–$C_4$ esters of carboxy($C_1$–$C_3$ alkyl) cellulose in an amount from about 50 to 10 weight percent.

Thus, the present invention provides a pigment dispersion comprising from about 10 to 90 weight percent by weight of a pigment and correspondingly about 90 to 10 percent by weight of a $C_2$–$C_4$ ester of carboxy($C_1$–$C_3$ alkyl) cellulose having an inherent viscosity of about 0.2 to 1.70 dL/g, as measured in a 60/40 (wt./wt.) solution of phenol/tetrachloroethane at 25° C., a degree of substitution per anhydroglucose unit of carboxy($C_1$–$C_3$ alkyl) of about 0.2 to about 0.70, and a degree of substitution per anhydroglucose unit of $C_2$–$C_4$ esters of about 1.5 to about 2.7.

$C_2$–$C_4$ esters of carboxy($C_1$–$C_3$ alkyl) cellulose of the present invention may be used in pigment dispersions by blending either a solution or a dispersion of the esters with the pigment with minimal shear in order to disperse the pigment. Useful pigments include metallic pigments such as aluminum, zinc, copper, nickel, brass, bronze, tin, mica and mixtures thereof. Preferred pigments for the practice of the present invention are aluminum flake pigments and mica. In the case of metallic pigments such as aluminum flake, the use of these esters forms a stable dispersion which can easily be incorporated into coating formulations having excellent metallic flake orientation and good opacity, while using a minimal amount of aluminum flake.

Particularly for aluminum flake, aqueous dispersions are difficult to make without the use of $C_2$–$C_4$ esters of carboxy ($C_1$–$C_3$ alkyl) cellulose, unless elaborately processed aluminum flakes are used. Standard passivated aluminum flake particles have a tendency to agglomerate upon addition of water when forming an aqueous aluminum flake dispersion. Water must be added carefully under constant stirring with the aid of pigment dispersants, or specially treated aluminum flakes must be used. In many cases, it may not be possible to make aqueous aluminum flake dispersions using standard formulating procedures.

However, aqueous aluminum dispersions may easily be made in the presence of the $C_2$–$C_4$ esters of carboxy($C_1$–$C_3$ alkyl) cellulose of the present invention. Standard passivated aluminum flake pigments, may readily be dispersed into aqueous paints or formulations by using the esters of the present invention.

Dispersions made from mixtures of $C_2$–$C_4$ esters of carboxy($C_1$–$C_3$ alkyl) cellulose and aluminum flake pigments result in aqueous paints having extremely bright face and excellent metallic flop. On the other hand, similar aqueous metallic flake formulations, which do not contain the $C_2$–$C_4$ esters of carboxy($C_1$–$C_3$ alkyl) cellulose, generally have poor metallic flake orientation and appear very dark gray after application.

The process of the present invention allows the formulator to prepare aqueous dispersions by adding water or aqueous components to an aluminum flake dispersion, without causing the aluminum flakes to agglomerate. It is preferred that the pigments be present in an amount of from about 10 weight percent to about 90 weight percent, and that the $C_2$–$C_4$ esters of carboxy($C_1$–$C_3$ alkyl) cellulose be present in an amount of from about 90 weight percent to about 10 weight percent. The type of pigment used and the mixing environment will determine the ratios of pigment to ester, as will be discussed herein below.

The aqueous dispersions may be prepared by adding an organic solution of $C_2$–$C_4$ esters of carboxy($C_1$–$C_3$ alkyl) cellulose to a metallic dispersion by gently stirring or by mixing the ester and the pigment components in any order using mechanical shear.

The organic solution of the $C_2$–$C_4$ esters of carboxy ($C_1$–$C_3$ alkyl) cellulose and aluminum flakes may then be partially to fully neutralized or made basic by adding an organic or inorganic base. The carboxylic acid groups on the $C_2$–$C_4$ esters of carboxy($C_1$–$C_3$ alkyl) cellulose may be reacted with a base to render the product water dispersible. Dispersion of the modified cellulose ester of the present invention in water is facilitated by neutralization of from about 25 to about 100% of the pendant carboxylate groups with an amine. The base may be added with water to the $C_2$–$C_4$ esters of carboxy($C_1$–$C_3$ alkyl) cellulose prior to the addition of organic solvent, to an organic solution of $C_2$–$C_4$ esters of carboxy($C_1$–$C_3$ alkyl) cellulose, or undiluted or diluted with an organic solvent to an organic solution of $C_2$–$C_4$ esters of carboxy($C_1$–$C_3$ alkyl) cellulose, followed by the addition of water. Useful bases include, but are not limited to, ammonia, piperidine, 4-ethylmorpholine, diethanolamine, triethanol-amine, ethanol-amine, tributylamine, dibutylamine, dimethylamino ethanol, triethylamine, aminomethyl propanol, N,N-dimethylaminoethanol, 2-amino-2-methyl-1-propanol and mixtures thereof.

This $C_2$–$C_4$ ester of carboxy($C_1$–$C_3$ alkyl) cellulose suspension, dispersion or solution may then be added directly to an aluminum flake dispersion that contains only aluminum flake and organic solvent. If the aluminum flake is chemically treated, such as with organic binders as well as passivation, the ester suspension, dispersion or solution may then be added to an aqueous aluminum flake dispersion.

The $C_2$–$C_4$ esters of carboxy($C_1$–$C_3$ alkyl) cellulose esters may also be added directly to aluminum flake which contains any solvent necessary to dissolve the esters. This method may also be adequate to keep the aluminum flakes dispersed.

Aqueous dispersions of $C_2$–$C_4$ esters of carboxy($C_1$–$C_3$ alkyl) cellulose esters made by swelling or dissolving the ester in a suitable aqueous base, followed by addition of a suitable organic solvent, as described hereinbelow, may be added directly to aluminum flake to yield an aqueous aluminum flake dispersion. All of the methods described above may be suitable to allow the aluminum flake to remain dispersed in the presence of water without agglomeration of the aluminum flake.

Thus, the present invention provides an aqueous dispersion having an aluminum flake to $C_2$–$C_4$ esters of carboxy ($C_1$–$C_3$ alkyl) cellulose ratio in the range of from about 10:90 to 90:10 weight percent. As discussed previously, for high shear environments, the pigments may be present, more preferably, in an amount from about 10 to 20 weight percent and the esters in an amount from about 90 to 80 weight percent. Similarly, for low shear environments, the pigments (especially when using aluminum flake) may be present, more preferably, in an amount of from about 50 to 90 weight percent and esters in an amount from about 50 to 10 weight percent.

The above aluminum flake dispersions containing a $C_2$–$C_4$ ester of carboxy($C_1$–$C_3$ alkyl) cellulose are easily formulated into both waterborne and solventborne type coatings, and provide improved aluminum flake orientation and improved hardness. In addition, the $C_2$–$C_4$ ester of carboxy($C_1$–$C_3$ alkyl) cellulose provides rheology control to the paint so that a uniform thickness of the coating can be maintained on the edges of the coating, which is particularly difficult to maintain in waterborne paints.

The coatings of the present invention may be applied to a substrate in the form of an organic solvent solution, an amine neutralized waterborne dispersion, a fully neutralized aqueous/organic colloidal dispersion, or as a zero VOC dispersion in aqueous ammonia. The coatings may also act as a protective coating for a variety of substrates, especially metal and wood.

Carboxymethylcellulose (CMC) esters of this invention, i.e., CMC propionate (CMCP), CMC acetate propionate (CMCAP), CMC butyrate (CMCB), and CMC acetate butyrate (CMCAB), as described above, exhibit improved solubility and compatibility (i.e., film clarity) characteristics over carboxymethylcellulose acetate or conventional cellulose esters (cellulose acetate, cellulose propionate, cellulose butyrate, cellulose acetate propionate, or cellulose acetate butyrate). These esters are soluble in most classes of typical coating solvents including ketones, esters, alcohols, glycol ethers, and glycol ether esters, while tolerating dilution with water or aromatic hydrocarbons. Examples of typical solvents include acetone, methyl ethyl ketone, methyl isobutyl ketone, methyl amyl ketone, methyl isoamyl ketone, 2-propoxyethanol, 2-butoxyethanol, ethyl 3-ethoxypropionate, ethanol, propanol, isopropyl alcohol, butanol, 2-ethyl-hexanol, ethyl acetate, propyl acetate, isopropyl acetate, butyl acetate, isobutyl acetate, ethylene glycol diacetate, 2-butanone, methanol, ethylene glycol monoethyl ether, ethylene glycol monopropyl ether, and ethylene glycol monobutyl ether and mixtures thereof. Other volatile inert solvents typically used in coating compositions may also be added. Organic solutions of the esters of this invention may be prepared by adding 1 to 1000 parts of solvent per part of ester; 1.5 to 9 parts of solvent per part of ester is preferred.

The $C_2-C_4$ esters of carboxy($C_1-C_3$ alkyl) cellulose of this invention are useful as rheology modifiers. At low concentrations (<5 weight percent on total formulation) amine neutralized waterborne dispersions have shown exponential viscosity changes with changes of as little as 0.5 weight percent concentration of the $C_2-C_4$ esters of carboxy ($C_1-C_3$ alkyl) cellulose. This rapid viscosity build is especially useful in the reduction of runs and sags in waterborne spray applications.

Additionally, the $C_2-C_4$ esters of carboxy($C_1-C_3$ alkyl) cellulose of this invention are useful as wetting agents. It has been unexpectedly found that the use of these esters results in a lower interfacial tension of the coatings in which they are incorporated. The carboxy($C_1-C_3$ alkyl) cellulose esters of the present invention impart markedly improved wetting properties to pigment dispersion of aluminum flakes in aqueous systems, thus preventing many surface imperfections.

Further, the esters of the present invention are relatively hard polymers, i.e., about 12 Knoop Hardness Units (KHU), and have high glass transition temperatures. They can be added to other resins to improve the coating hardness and to improve properties such as slip, sag resistance, and mar resistance. To further improve the toughness, crosslinkers such as melamines or isocyanates may be added to react with these esters or with other resins.

The present invention also has found utility in high solids coatings. In low solids, solventborne coatings, metallic flake orientation is controlled by the ability for a polymeric solution to shrink upon drying. As is known in the art, cellulose esters exhibit a high free volume change upon drying, thus causing a cellulose ester solution to shrink dramatically during film formation. Therefore, conventional cellulose esters are added to low solids formulations, in which they have compatibility with the resins and solvents used, to orient the metallic flakes upon drying.

In high solids coatings, different types of resins are used in order to achieve suitable formulations at higher solids applications. Many of the resins and solvents used in such applications lack compatibility with conventional cellulose esters. Therefore, these formulations cannot take advantage of the large free volume change that cellulose esters possess when going from a solution state to a solid state. Because of their improved compatibility with various resins and solvents, the $C_2-C_4$ esters of carboxy($C_1-C_3$ alkyl) cellulose esters of the present invention have found utility in those high solids coatings formulations where they are compatible with both the solvent and resin systems used. Suitable resins for preparation of high solids coatings include acrylic, polyester, isocynate, polyurethane, melamine, urea formaldeghyde resins, and mixtures thereof. In high solids coating applications, which typically contain at least 35% solids content, the esters of the present invention have the ability to improve the metallic flake orientation and flow properties of coatings by their unique ability to wet the pigment and substrate surfaces as well as provide metallic flake orientation.

The esters of the present invention possess free hydroxyl groups and thus can also be utilized in conjunction with crosslinking agents such as melamines and isocyanates. Such melamines are preferably compounds having a plurality of $—N(CH_2OR)_2$ functional groups, wherein R is $C_1-C_4$ alkyl, preferably methyl. In general, the melamine crosslinking agent may be selected from compounds such as those described in U.S. patent No. (Ser. No. 08/861,462), incorporated herein by reference. Preferred crosslinking agents include hexamethoxymethylamine, tetramethoxymethylbenzoguanamine, tetramethoxymethylurea, mixed butoxy/methoxy substituted melamines, and the like. The most preferred melamine cross-linking agent is hexamethoxymethylamine.

Typical isocyanate crosslinking agents and resin include hexamethylene diisocyanate (HMDI), isophorone diisocyanate (IPDI), and toluene diisocyanate.

Since there are free —COOH groups present on the esters of the present invention, one could use the usual crosslinkers and resins used with carboxyl functional resins, e.g., epoxy resins or glycidyl-functional resins. Preferred epoxy functional resins generally have a molecular weight of about 300 to about 4000, and have approximately 0.05 to about 0.99 epoxy groups per 100 g of resin (i.e., 100–2000 weight per epoxy (WPE)). Such resins are widely known and are commercially available under the EPON® trademark of the Shell Chemical Company, the ARALDITE® trademark of CIBA-Geigy, and D.E.R. resins of the Dow Chemical Company.

Thus, the present invention provides a coating composition comprising
  (a) about 0.1 to about 50 weight percent, based on the total weight (a) and (b) in said composition, of a $C_2-C_4$ ester of carboxy(C1–C3 alkyl)cellulose, an inherent viscosity of about 0.20 to 1.70 dL/g, as measured in a 60/40 (wt./wt.) solution of phenol/tetra-chloroethane at 25° C., a degree of substitution per anhydroglucose unit of carboxy($C_1-C_3$ alkyl) of greater than 0.2 to about 0.75, and a degree of substitution per anhydroglucose unit of $C_2-C_4$ esters of about 1.5 to about 2.70;
  (b) about 0.1 to 50 weight percent, based on the total weight of (a) and (b) in said composition, of a resin selected from the group consisting of polyesters, polyester-amides, cellulose esters, alkyds, polyurethanes, epoxy resins, polyamides, acrylics, vinyl polymers, polyisocyanates, and melamines; and
  (c) an organic solvent or solvent mixture; wherein the total weight of (a) and (b) is about 5 to 70 weight percent of the total weight of (a), (b), and (c).

In the compositions of the invention, the total weight of a), b),and c) will of course equal 100%.

Thus, as a further aspect of the present invention, there is provided a waterborne coating composition comprising (a) about 0.1 to about 50 weight percent, based on the total weight of (a) and (b), of a $C_2$–$C_4$ ester of carboxy ($C_1$–$C_3$ alkyl)cellulose, an inherent viscosity of about 0.20 to 1.70 dL/g, as measured in a 60/40 (wt./wt.) solution of phenol/tetra-chloroethane at 25° C., a degree of substitution per anhydroglucose unit of carboxy(C1–C3 alkyl) of greater than about 0.20 to about 0.75, and a degree of substitution per anhydroglucose unit of $C_2$–$C_4$ esters of about 1.50 to about 2.70; wherein at least about 25 percent of all free carboxyl groups on said $C_2$–$C_4$ ester of carboxy($C_1$–$C_3$ alkyl)cellulose have been neutralized with ammonia or an amine;

(b) at least 50 weight percent, based on the total weight of (a) and (b), of a compatible water soluble or water dispersible resin selected from the group consisting of polyesters, polyester-amides, cellulose esters, alkyds, polyurethanes, epoxy resins, polyamides, acrylics, vinyl polymers, polyurethanes, and melamines;

(c) water;

(d) an organic solvent; wherein the total weight of (a) and (b) is between 5 and 50 weight percent of the total composition and the organic solvent comprises less than 20 weight percent of the total weight of the composition.

As a further aspect of the present invention, the above compositions are further comprised of one or more coatings additives. Such additives are generally present in a range of about 0.1 to 15 weight percent, based on the total weight of the composition. Examples of such coatings additives include leveling, flow control agents and rheology modifiers such as silicones, clays, fluorocarbons, cellulosics, and organic rheology modifiers such as acrylics, and mixtures thereof; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in *Raw Materials Index,* published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID®; polypropylene, available from Hercules Inc., under the trademark HERCOFLAT®; synthetic silicate, available from J. M Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxy-ethyl)-N-octadecyl sulfosuccinnamate, disodium N-octasulfo-succinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO® trademarks of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithio-carbamate, adamantane, N-trichloro-methylthio) phthalimide, 2,4,5,6-tetra-chloroisophthalo-nitrile, ortho-phenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the trademark TINUVIN, and diethyl-3-acetyl-4hydroxy-benzyl-phosphonate, 4-dodecyl-oxy-2-hydroxy benzophenone, and resorcinol monobenzoate.

To prepare the coated articles of the present invention, the formulated coating composition containing carboxy($C_1$–$C_3$ alkyl) cellulose esters of the present invention is applied to a substrate and allowed to air dry. The substrate can be, for example, wood; plastic; metal such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions envisioned by the present invention are typical organic pigments and inorganic pigments, well-known to one of ordinary skill in the art of surface coatings. Especially useful pigments are those set forth by the *Colour Index,* 3d Ed., 2d Rev., 1982, published by the Society of Dyers and Colourists in association with the American Association of Textile Chemists and Colorists. Examples of organic pigments include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1. Useful inorganic pigments, as discussed above, include but are not limited to, aluminum, zinc, copper, nickel, brass, bronze, tin, mica and mixtures thereof.

EXAMPLES

The $^1$H NMR results were obtained using a JEOL Model GX-270 NMR spectrometer operated at 270 MHz. Sample tube size was 5 mm. The sample temperature was 80° C., the pulse delay 5 sec. and 64 scans were acquired for each experiment. Chemical shifts are reported in ppm from tetramethylsilane, with residual DMSO as an internal reference. The chemical shift of residual DMSO was set to 2.49 ppm.

The acid number of the carboxy(C1–C3 alkyl) cellulose ester was determined by titration as follows. An accurately weighted aliquot (0.5–1.0 g) of the carboxy(C1–C3 alkyl) cellulose ester was mixed with 50 mL of pyridine and stirred. To this mixture was added 40 mL of acetone followed by stirring. Finally, 20 mL of water was added and the mixture stirred again. This mixture was titrated with 0.1N sodium hydroxide in water using a glass/combination electrode. A blank consisting of 50 mL pyridine, 40 mL of acetone and 20 mL water was also titrated. The acid number was calculated as follows where Ep=mL NaOH solution to reach end point of sample
B=mL NaOH solution to reach end point of blank
N=normality of sodium hydroxide solution
Wt.=weight of carboxy(C1–C3 alkyl) cellulose ester titrated Acid Number (mg KOH/g sample)=((Ep-B)*N*56.1)/Wt.

The acetyl, propionyl, and butyryl weight percents were determined by a hydrolysis GC method. In this method, about 1 g of ester was weighed into a weighing bottle and dried in a vacuum oven at 105° C. for at least 30 minutes. Then 0.500+/−0.001 g of sample was weighed into a 250 mL Erlenmyer flask. To this flask was added 50 mL of a solution of 9.16 g isovaleric acid, 99%, in 2000 mL pyridine. This mixture was heated to reflux for about 10 minutes after which 30 mL of methanolic potassium hydroxide solution was added. This mixture was heated at reflux for about 10 minutes. This mixture was allowed to cool with stirring for 20 minutes and then 3 mL of concentrated hydrochloric acid was added. The mixture was stirred for 5 minutes and then allowed to settle for 5 minutes. About 3 mL of solution was transferred to a centrifuge tube and centrifuged for about 5 minutes. The liquid was analyzed by GC (split injection and flame ionization detector) with a 25M×0.53 mm fused silica column with 1 micron FFAP phase. The weight percent acyl was calculated as follows where:

Ci=concentration of l(acyl group)
Fi=relative response factor for component I
Fs=relative response factor for isovaleric acid
Ai=area of component I
As=area of isovaleric acid
R=(grams of isovaleric acid)/(g sample)
Ci=((Fi*Ai)/Fs*As))*R*100

This GC method was used instead of NMR because the methylene of the carboxymethyl group cannot be separated from the ring protons of the cellulose backbone making absolute DS measurements by NMR impossible. The DS values were calculated by converting the acid number to percent carboxymethyl.

Products used in the examples were Laponite® RD synthetic clay mineral from Southern Clay Products, Inc.; Carboset® 511 acrylic waterborne resin from B. F. Goodrich; Dee Fo® 3000 antifoam/defoamer from Ultra Additives, Inc.; Aquapaste® aluminum flake for waterborne systems, Sparkle Silver® 303AR aluminum paste for organic solvent systems and Silberline® E3053 water dispersible, treated and coated aluminum flake, all from Silberline, Inc.; Paraloid® WR97 water reducible acrylic resin and Acryloid® AT954 organic solvent-borne acrylic resin, both from Rohm and Haas; Cymel® 303 modified melamine resin and Cymel® 325 modified melamine resins, both from Cytec Industries, Inc.; Carbopol® EP-1 acrylic thickener from B. F. Goodrich; Eastman® EB ethylene glycol monobutyl ether from Eastman Chemical Company; BYK® 156 dispersing aid from BYK-Chemie, USA, Inc.; Ircosperse® 2174 dispersing aid for latex systems from Lubrizol Corporation; Jägotex® EM325 self-crosslinking acrylic resin for water-borne systems from Jäger, Ltd.; Tilcom® AT23 titanium-ethanolamine complex from ICI; Aromatic® 100 hydrocarbon solvent from Exxon Chemical Company and Nacure® 2500 amine salt of aromatic sulfonic acid in isopropanol from King Industries.

Example 1: Preparation of a $C_2$–$C_4$ Ester of Carboxy($C_1$–$C_3$ alkyl)Cellulose Carboxymethyl cellulose (Na salt form, approximately 0.35 DS carboxymethyl based on final product calculations) was converted to the free acid (CMC—H) by adding 100 grams of CMC(Na)(about 70% CMC—Na by wt.) to 2100 grams of 2% sulfuric acid. After about 2 to 5 minutes, the sample was filtered free of excess liquids and washed with demineralized water. The protonated CMC was transferred to a glass fritted funnel and excess water removed. The activate was dewatered by solvent exchange with three 250 gram portions of acetic acid and three 250 gram portions of butyric acid to give butyric acid wet CMC(H) activate (about 15 to 40 wt % solids). The activate was transferred to a 2 liter round bottom flask and chilled in ice for 1 hour. The activate was esterified by treating with 264 grams of butyric anhydride, 30 grams of acetic anhydride, and 2.94 grams of sulfuric acid at 0C. The reaction was allowed to warm as a result of the exotherm and proceeded to dissolution after 2.1 hours at 45° C. (additional heat was required to hold the temperature at 43° C.). A solution of 74 grams of water and 74 grams of acetic acid was added dropwise to the reaction mixture over 30 minutes generating an exotherm of approximately 15° C. as a result of reaction of excess anhydride with water. The contents were hydrolyzed by heating to 60° C. for 4.5 hours. The sulfuric acid catalyst was then neutralized by the addition of 7.1 grams of magnesium acetate (tetrahydrate) in 20 mL of water and 19 mL of acetic acid. The reaction contents were diluted with an equal weight of acetic acid and precipitated by adding 3,000 mL of 10% aqueous acetic acid. The precipitated particles were hardened by the addition of 3,000 mL of water. The contents were filtered, washed with de-ionized water, and dried to obtain 106 grams of the protonated form of carboxymethyl cellulose acetate butyrate as a white granular powder: GC % acetyl 6.38, GC % butyryl 39.52%; acid number 58.0; PPM sulfur 39; molecular weight number average 84,700; inherent viscosity (IV) 1.02 dL/g (60/40 wt./wt. solution of phenol/tetrachloroethane at 25° C). Calculation for degree of substitution (DS) gives: carboxymethyl 0.35, acetyl 0.50, butyryl 1.88, and hydroxyl 0.27.

The most highly preferred method for preparation of carboxy($C_1$–$C_3$ alkyl) cellulose esters of the invention is as follows:

1. Conversion of carboxy($C_1$–$C_3$ alkyl) cellulose-sodium salt to the acid form (here, carboxymethyl cellulose):

Carboxymethyl cellulose (Na Salt) was converted to the free acid by the addition of 100 grams of carboxymethyl cellulose to 2–16% aqueous sulfuric acid at 27–60° C. The solids content of the resulting slurry was about 6%. The slurry was stirred for about 15 minutes and the acid solution was filtered to recover the converted CMC.

2. Activation of CMC (CMC—H):

CMC—H was washed in water with stirring for 5 minutes to 1 hour. The water was drained to approximately 20% solids. The water-wet CMC was dewatered by washing 3 times with 200–500 grams of acetic acid followed by 3 washes with 200–500 grams of butyric acid. In between each wash the sample was drained to approximately 16–18% solids. After the final butyric acid wash, vacuum was applied to obtain the butyric acid wet CMC—H activate at 15–40% solids.

3. Esterification:

The butyric acid wet CMC-H was combined with 31 grams of acetic anhydride, and 253 grams of butyric anhydride at 0° C. A catalyst solution consisting of 3.44 grams of sulfuric acid in 3.44 grams of acetic acid was added slowly to the reaction mixture keeping the temperature below 30° C.

After completion of the catalyst addition, the temperature was ramped from 30° C. to 35° C. over 150 minutes. The temperature was then ramped from 35° to 45° C. over a 60 minute period. The reaction mass was heated at 45° C. until complete dissolution of the solids to an acid dope.

4. Hydrolysis:

A solution of 95 grams of water and 95 grams of acetic acid was added to the acid dope over 30–45 minutes at 40–45° C. thereby adjusting the water concentration to 13–14%. The temperature was increased to 70° C. and held for 2 hours. Then, 7.53 grams of magnesium acetate (tetrahydrate) in 25 grams of water and 25 grams of acetic acid was added to neutralize the strong acid catalyst.

5. Filtration:

The resulting dope was diluted with acetic acid and water to give about a 1:1 ratio of acetyl/butyryl and approximately 20% water concentration. The acid dope was held at 65° C. and circulated through a 0.5 micron filter to remove any particulates.

6. Precipitation:

The dope from above was added to water with agitation to give a flake precipitate. This material was allowed to harden, washed with water, and dried at 60° C. An optional precipitation method is to add 10% aqueous acetic in sufficient volume to yield about 30% organic acid in the final precipitation bath followed by the addition of an equal amount of water. The precipitate is then washed with water, and dried at 60° C. This yields a carboxymethyl cellulose acetate butyrate with the following general analysis: Acid number 55–60, PPM Sulfur 25–100 PPM, IV (60/40 (wt./wt.) solution of phenol/tetrachloroethane at 25° C.) 0.5–0.7 dL/g, DS of carboxymethyl groups 0.30–0.35, acetyl 0.4–0.6, butyryl 1.7–2.05, and hydroxyl of 0.1–0.6.

Example 2: Aluminum Flake Dispersions With CMCAB in Order of Addition

| | |
|---|---|
| AquaPaste 303-B137(70% NV) | 7.84 |
| Eastman EB | 7.84 |
| 30% CMCAB | 10.00 |
| (The CMCAB had an I.V.=0.69, | |
| DS Bu = 1.96, DS Ac = 0.49, DS CM = 0.36, | |
| Acid Number = 58, DS OH = 0.19) | |
| 2-amino-2-methyl-1-propanol (95%) | 0.32 |
| Deionized water | 5.00 |
| Dee Fo 3000 | 0.04 |
| Laponite RD (3% NV in water) | 30.00 |

With this formulation, the aluminum flake remained well dispersed. The aluminum flake did not agglomerate upon addition of acrylic resins or aqueous components, particularly in the presence of clay thickeners. Coating formulations with the aluminum flake dispersion above, showed excellent metallic flake orientation and good face brightness. Passivated aluminum flake is recommended for aqueous systems to prevent the generation of hydrogen gas, as known in the art.

Example 3: Aluminum Flake Dispersion Without CMCAB

| | |
|---|---|
| Aquapaste 303-B13 | 7.84 |
| Eastman EB | 7.84 |
| Paraloid WR97(70% NV) | 4.28 |
| 2-amino-2-methyl-1-propanol (95%) | 0.04 |
| Dee Fo 3000 | 0.04 |
| Eastman EB | 2.16 |
| Deionized Water | 10.00 |
| Laponite RD (3% NV in water) | 30.00 |

The aluminum flake in this formulation agglomerated upon addition of aqueous components. Changing the order of addition of the aqueous components did not prevent the aluminum flake from agglomerating.

Example 4: Aqueous Dispersion With CMCAB

| | |
|---|---|
| CMCAB | 30.0 |
| CMCAB had an IV = 0.61, | |
| DS Bu = 1.90, DS Ac = 0.63, DS OH = 0.13, | |
| DS CM = 0.34. | |
| Deionized water | 100.0 |
| Dimethylaminoethanol | 4.0 |
| Eastman EB | 34.0 |
| Water to 5% NV | 412.0 |

The CMCAB (acid number was approximately 60) was allowed to swell in water to which the dimethylaminoethanol was added. After swelling, Eastman EB was added to facilitate dissolution of the CMCAB. Water was then added to bring concentration of the CMCAB to 5% NV. This method produced a stable dispersion.

Example 5: Aqueous CMCAB Dispersion

| | |
|---|---|
| CMCAB (Acid number 88) | 2.00 g |
| CMC acetate butyrate had an IV = 0.22, | |
| DS Bu = 2.07, DS Ac = 0.29, DS OH = 0.08, | |
| DS CM = 0.56. | |
| Water | 10.00 g |
| Dimethylaminoethanol | 0.34 g |
| Eastman EB | 1.00 g |

The CMCAB(Acid number 88) was allowed to swell in the water to which the dimethylaminoethanol was added. After swelling, Eastman EB was added to the mixture and a clear dispersion was made to which more water could be added if desired.

Example 6: Aqueous Aluminum Flake Dispersion With CMCAB

Part A:

| | |
|---|---|
| CMCAB (Acid number 96) | 2.00 g |
| CMCAB had an IV = 0.25, | |
| DS Bu = 1.15, DS Ac = 0.81, DS OH = 0.51, | |
| DS CM = 0.53. | |
| Water | 10.00 g |
| Dimethylaminoethanol | 0.34 g |
| Eastman EB | 1.00 g |

-continued

| Part B: | |
|---|---|
| Aquapaste 303-B13 | 7.84 g |
| Eastman EB | 7.84 g |

5.90 g of Part A were added to Part B

The CMCAB (Acid number 96) was allowed to swell in the water to which the dimethylaminoethanol was added. After swelling, Eastman EB (ethylene glycol monobutyl ether) was added to the mixture and a clear dispersion was made to which more water could be added if desired. Additional solvent may help facilitate producing a clear dispersion for CMCAB samples with acid numbers lower than 65. After the aqueous dispersion of CMCAB was added to the organic dispersion of aluminum flake, the aluminum flake remained well dispersed with no obvious agglomeration.

Example 7: Thermoset Acrylic/Melamine Basecoat Formulation Using Clay Rheology Modifier

| | |
|---|---|
| Aquapaste 303-B137 | 4.23 |
| Eastman EB | 4.23 |
| 30% CMCAB in Eastman EB | 5.93 |
| CMCAB had an I.V. = 0.58, | |
| DS Bu = 1.93, DS Ac = 0.51 DS OH = 0.20, | |
| Acid number = 58.8 | |
| 2-amino-2-methyl-1-propanol (95%) | 0.19 |
| Cymel 303 | 4.55 |
| Dee Fo 3000 | 0.02 |
| Water | 5.22 |
| Paraloid WR97 (70% NV) | 14.04 |
| 2-amino-2-methyl-1-propanol (95%) | 0.43 |
| Laponite RD(3% NV in water) | 16.18 |
| Deionized water | 44.71 |
| NaCure 2500 (neutralized with 2-amino- | 0.27 |
| 2-methyl-1-propanol (9%), 12.5% active | 0.27 |
| | 100.00 |

The basecoat formula above could be easily applied and had good metallic flake orientation.

A similar formulation using Laponite® RD as the sole thickener could not be made, due to the agglomeration of the aluminum flake particles without the use of dispersing aids in larger than desired quantities,(such as in the formulation that follows).

Example 8: Aqueous Thermoset Acrylic/Melamine Basecoat Formulation With Aluminum Flake, Without CMCAB

| Part A: | |
|---|---|
| Aquapaste 303-B137 | 15.68 |
| Eastman EB | 15.68 |
| Cymel 303 | 16.44 |
| BYK-Chemie BYK 155 | 0.50 |
| Part B: | |
| 1. Paraloid WR97 (70% NV) | 28.04 |
| 2. 2-amino-2-methyl-1-propanol (95%) | 0.86 |
| 3. Deionized water | 80.00 |

An aqueous dispersion of Paraloid WR97 was formed by mixing 1,2 and 3 of Part B together and this was added to the Laponite dispersion (4 of Part B) along with the catalyst (5 of Part B).

| | |
|---|---|
| 4. Laponite RD (3% NV in water) | 30.00 |
| 5. NaCure 2500 (neutralized with 2-amino,2-methyl-1-propanol(95%), 12.5% active) | 0.50 |

Part B formed a stable dispersion; Part A formed a stable dispersion. However, when Part B was added to 24.23 g of Part A, the aluminum flake agglomerated.

Without CMCAB, a stable dispersion was not formed when using Laponite RD thickener as the sole thickening agent in combination with the resins (Paraloid WR97 and Cymel 303) and the aluminum flake (Aquapaste 303).

Example 9: Thermoset Acrylic/melamine Basecoat Formulation With Aluminum Flake

| | |
|---|---|
| Aquapaste 303-B137 | 5.15 |
| Eastman EB | 5.15 |
| Cymel 303 | 5.55 |
| BYK 156 | 0.79 |
| Ircosperse 2174 | 0.92 |
| Laponite RD (3%) | 19.72 |
| Eastman EB | 9.20 |
| Paraloid WR97 (70% NV) | 18.41 |
| 2-amino-2-methyl-1-propanol (95%) | 0.53 |
| Ircosperse 2174 | 1.05 |
| Water | 32.87 |
| Nacure 2500 (neutralized, 12.5% active) | 0.66 |
| Total | 100.00 |

The aluminum flake did not agglomerate upon adding the water initially. However, it was not as well dispersed as aluminum flake in Example 7 containing CMCAB. No panels were sprayed with this formulation due to the appearance of agglomerated aluminum flake after several days.

Example 10: Thermoset Acrylic/melamine Basecoat Formulation, Containing Aluminum Flake

| Part A: | |
|---|---|
| Carboset 511 (30% NV) | 54.16 |
| Cymel 325 | 9.37 |
| Carbopol EP-1, 8.29% as supplied | 15.00 |
| Dee Fo 3000 | 0.05 |
| Deionized water | 49.08 |
| Al Dispersion (Part B): | |
| Aquapaste 7005-C63 (70% NV) | 6.43 |
| CMCAB (30% NV in Eastman EB) | 4.19 |
| CMC acetate butyrate had an IV = 0.61, | |
| DS Bu = 1.90, DS Ac = 0.63, DS OH = 0.13, | |
| DS CM = 0.34. | |
| Eastman EB | 6.43 |
| Dimethylaminoethanol | 0.08 |
| Deionized water | 10.81 |

Part A was added to Part B. This resulted in a smooth paint formulation with no obvious agglomeration of the aluminum pigments.

Example 11: Thermoset Acrylic/melamine Basecoat Formulation, Containing Aluminum Flake, Without CMCAB

| Part A | |
|---|---|
| Carboset 511 (30% NV) | 59.45 |
| Carbopol EP-1 (8.29% as supplied) | 65.00 |
| Dee Fo 3000 | 0.05 |
| Part B (Aluminum Dispersion) | |
| Aquapaste 7005-C63 | 6.43 |
| Cymel 325 | 9.37 |
| Eastman EB | 9.43 |
| Deionized water | 11.39 |

Part A was added to part B. The resulting formulation did not have the smooth appearance of the basecoat in Example 10, although no obvious flocculation of the aluminum flake had occurred. Both paints (Examples 10 & 11) had Ford cup, #4, viscosities of 18.5–20.4 sec. The paints were poured onto aluminum weighing dishes and examined as they dried. The paint which contained CMCAB (Example 10 Formulation) gave a very smooth surface, with no underlying imperfection in the surface coating and the metallic flake had good orientation. On the other hand, the paint formulation which did not contain CMCAB (Example 11 Formulation) had severe Be'nard cell formation, giving the appearance of alligator skin. When the latter paint was made thicker by the addition of 35 more grams of Carbopol EP-1 thickener (8.29%), raising the Brookfield viscosity from 130 cP to 325 cP, the latter still formed Be'nard cells.

Example 12: Automotive Basecoat Lacquer

| | |
|---|---|
| Aqueous CMCAB dispersion from Example 4 | 89.6 |
| Carboset 511 | 30.0 |
| Silberline E3053 Al Flake (1:1 water) | 10.27 |
| (specially treated aluminum flakes to be dispersible directly into water) | |
| Tilcom AT23(Titanium ethanolamine complex) | 1.5 |
| Water to 16 seconds DIN4 | 91.75 |
| (7.9% NV at spray viscosity) | |

The sprayed panel from the above formulation had very good face brightness and superior aluminum flake orientation to a similar formulation not containing CMCAB. It was difficult to make an aluminum basecoat without the use of CMCAB.

Example 13: Silver Metallic Basecoat Formulation Using Self Crosslinking Acrylic and CMCAB

| | |
|---|---|
| Jägotex EM325 | 25.0 |
| CMCAB dispersion (from Example 4) | 56.0 |
| Silberline E3053 | 4.2 |
| Water to 16 seconds DIN4 | 34.1 |
| 14.6% NV at spray viscosity | |

Again, the formulation in example 13 gave good metallic flake orientation and excellent flop.

It was not possible to produce a formulation without CMCAB which adequately wetted-out the substrates. Without the use of CMCAB, the acrylic formulation, even when it did not contain aluminum flake, could not be drawn down on glass, plastic or metal, due to severe wetting problems. The acrylic formulation formulated without aluminum flake, but with CMCAB, showed good wetting on all substrate surfaces. The addition of CMCAB dramatically improved the wetting characteristics of the paint.

Example 14: High solids Acrylic/Melamine Basecoat with Aluminum Flake Normalized to 100 g

| | |
|---|---|
| Sparkle Silver SS-303AR (70% NV) | 9.97 |
| n-butyl acetate | 9.97 |
| Acryloid AT954(85% NV) | 28.06 |
| Cymel 303 | 11.93 |
| Aromatic 100 | 1.24 |
| p-toluene sulfonic acid in n-butyl alcohol (50%) | 0.97 |
| n-butyl acetate | 15.77 |
| CMCAB(20% in n-butyl acetate) | 17.02 |
| CMCAB had an IV = 0.721 | |
| DS Bu = 1.90, DS Ac = 0.63, DS OH = 0.13, DS CM = 0.34. | |
| n-butyl acetate | 4.31 |
| n-butyl alcohol | 0.76 |

This formulation with CMCAB showed excellent metallic flake orientation with good face brightness. Without a rheology modifier such as CMCAB, this formulation had poor metallic flake orientation, poor flow and leveling and poor spraying properties.

Example 15: Evaluation of Surface Tension and Interfacial Tension on Jägotex EM325 With and Without CMCAB To compare the drying rates, the surface and interfacial tensions, formulations in Example 13 were prepared with and without CMCAB formulations which did not contain aluminum flake as mentioned. Each contained the same amount of water, solvent and solids content.

Formulation 15A (With CMCAB)

| | |
|---|---|
| Jägotex E325 | 25.0 g |
| CMCAB dispersion (5% NV, from Example 4) | 56.0 g |
| Water | 13.0 g |

Formulation 15B (No CMCAB)

| | |
|---|---|
| Jägotex E325 | 33.1 g |
| Eastman EB | 3.5 g |
| Water | 63.4 g |

Each gave a solids content of 14.9% resins by weight; and 3.5% EB by weight.

Drying Rates

The drying rates could not be compared due to the poor wetting charateristics of Formulation 15B. Therefore surface tension and interfacial tension measurements were done to determine the cause of the improvement in wetting when CMCAB was added to the formulation.

Surface Tension

Surface tension of solutions with and without CMCAB was measured by Wilhemy plate/wetting balance method at room temperature. Both advancing and receding data were measured twice.

No significant difference was detected between the formulation containing CMCAB and that which did not.

Interfacial Tension

Contact angles of the solutions on solid substrates (aluminum, unpolished steel and polished steel) were measured by the sessile drop/video contact angle method. The contact angle value is the average of five different drops, each drop measured on left and right sides, at five different locations on the substrate making a total of ten measurements.

The contact angle is the parameter directly related to the interfacial tension. Smaller contact angle means lower interfacial tension and thus better wetting, of significant importance in coatings.

TABLE 1

INTERFACIAL TENSION DATA
Contact Angles in degrees (Std. Dev)

| Substrate | No CMCAB | With CMCAB |
|---|---|---|
| Aluminum | 50.5(0.8) | 43.8(1.5) |
| Steel (unpolished) | 36.1(1.2) | 30.9(0.8) |
| Steel (polished) | 37.9(1.5) | 28.7(0.8) |

TABLE 2

SURFACE TENSION DATA
Surface Tension in dyne/cm (difference)*

| | No CMCAB | With CMCAB |
|---|---|---|
| Advancing | 29.5(0.6) | 33.0(0.4) |
| Receding | 32.0(0.1) | 33.5(0.2) |

*Average of two measurements

We claim:

1. An aqueous pigment dispersion comprising about 10 to 90 weight percent by weight of a pigment and about 90 to 10 weight percent of a $C_2$–$C_4$ ester of carboxy ($C_1$–$C_3$) alkyl cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7.

2. The aqueous pigment dispersion of claim 1 wherein said pigment is selected from the group consisting of organic and inorganic pigments.

3. The aqueous pigment dispersion of claim 2 wherein said organic pigment is selected from the group consisting of CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1; and wherein said inorganic pigment is selected from the group consisting of aluminum, zinc, copper, nickel, brass, bronze, tin, mica and mixtures thereof.

4. The aqueous pigment dispersion of claim 1 wherein said $C_2$–$C_4$ ester of carboxy ($C_1$–$C_3$) alkyl cellulose is selected from the group consisting of carboxymethyl cellulose propionate, carboxymethyl cellulose butyrate, carboxymethyl cellulose acetate propionate and carboxymethyl cellulose acetate butyrate.

5. The aqueous pigment dispersion of claim 1 comprising about 10 to 20 weight percent of a pigment and about 90 to 80 weight percent of a $C_2$–$C_4$ ester of carboxy ($C_1$–$C_3$) alkyl cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7.

6. The aqueous pigment dispersion of claim 5 wherein said pigment is selected from the group consisting of organic and inorganic pigments.

7. The aqueous pigment dispersion of claim 6 wherein said organic pigment is selected from the group consisting of CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1; and wherein said inorganic pigment is selected from the group consisting of aluminum, zinc, copper, nickel, brass, bronze, tin, mica and mixtures thereof.

8. The aqueous pigment dispersion of claim 5 wherein said $C_2$–$C_4$ ester of carboxy ($C_1$–$C_3$) alkyl cellulose is selected from the group consisting of carboxymethyl cellulose propionate, carboxymethyl cellulose butyrate, carboxymethyl cellulose acetate propionate and carboxymethyl cellulose acetate butyrate.

9. The aqueous pigment dispersion of claim 1 comprising about 50 to 90 weight percent of a pigment and about 50 to 10 weight percent of a $C_2$–$C_4$ ester of carboxy ($C_1$–$C_3$) alkyl cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7.

10. The aqueous pigment dispersion of claim 9 wherein said pigment is selected from the group consisting of organic and inorganic pigments.

11. The aqueous pigment dispersion of claim 10 wherein said organic pigment is selected from the group consisting of CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1; and wherein said inorganic pigment is selected from the group consisting of aluminum, zinc, copper, nickel, brass, bronze, tin, mica and mixtures thereof.

12. The aqueous pigment dispersion of claim 9 wherein said $C_2$–$C_4$ ester of carboxy ($C_1$–$C_3$) alkyl cellulose is selected from the group consisting of carboxymethyl cellulose propionate, carboxymethyl cellulose butyrate, carboxymethyl cellulose acetate propionate and carboxymethyl cellulose acetate butyrate.

13. A method of making an aqueous pigment dispersion comprising:

forming an organic solution of $C_2$–$C_4$ ester of carboxy ($C_1$–$C_3$) alkyl cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7;

forming an aqueous solution of pigment;

mixing said organic solution of esters with said aqueous solution of pigment;

partially or fully neutralizing said mixture by adding an organic or inorganic base; and adding water to form an aqueous pigment dispersion.

14. The method of claim 13 wherein said pigment is selected from the group consisting of organic and inorganic pigments.

15. The method of claim 14 wherein said organic pigment is selected from the group consisting of CI Pigment White 6 (titanium dioxide); CI Pigment Red 101 (red iron oxide); CI Pigment Yellow 42, CI Pigment Blue 15, 15:1, 15:2, 15:3, 15:4 (copper phthalo-cyanines); CI Pigment Red 49:1; and CI Pigment Red 57:1; and wherein said inorganic pigment is selected from the group consisting of aluminum, zinc, copper, nickel, brass, bronze, tin, mica and mixtures thereof.

16. The method of claim 13 further comprising adding a rheology modifier.

17. The method of claim 13 wherein said organic solution of esters is formed by dissolving said esters in an organic solvent selected from the group consisting of acetone, methyl ethyl ketone, methyl isobutyl ketone, methyl amyl ketone, methyl isoamyl ketone, 2-propoxy-ethanol, 2-butoxyethanol, ethyl 3-ethoxypropionate, ethanol, propanol, isopropyl alcohol, butanol, 2-ethyl-hexanol, ethyl acetate, propyl acetate, isopropyl acetate, butyl acetate, isobutyl acetate, ethylene glycol diacetate, 2-butanone, methanol, ethylene glycol monoethyl ether, ethylene glycol monopropyl ether, and ethylene glycol monobutyl ether and mixtures.

18. The method of claim 13 wherein said organic or inorganic base is selected from the group consisting of ammonia, piperidine, 4-ethyl-morpholine, diethanolamine, triethanolamine, ethanolamine, tributylamine, dibutylamine, and dimethylamino ethanol triethylamine, aminomethyl propanol, N,N-dimethylaminoethanol, 2-amino-2-methyl-1-propanol and mixtures thereof.

19. An aqueous cellulose ester dispersion comprising $C_2$–$C_4$ esters of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7; water; and a base.

20. The aqueous cellulose ester dispersion of claim 19 further comprising an organic solvent.

21. A method of making an aqueous cellulose ester dispersion comprising:

mixing an organic solvent with a $C_2$–$C_4$ esters of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7, to form an organic solution of esters;

adding an organic or inorganic base to water to form a basic water solution;

mixing said organic solution of esters and said basic water solution to form an aqueous dispersions of esters.

22. A method of making an aqueous metallic pigment dispersion comprising:

dissolving in water, a $C_2$–$C_4$ ester of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7;

adding a base to neutralize about 25 to 100 percent of the pendant carboxyl groups of the cellulose esters;

mixing a metallic pigment with an organic solvent; and mixing the organic solution of metal pigment with the neutralized aqueous solution of esters.

23. A method of making an aqueous metallic pigment dispersion comprising:

swelling or dissolving in an aqueous base, a $C_2$–$C_4$ ester of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7, to form a basic solution of esters;

adding an organic solvent to said basic solution of esters to form a mixture; and adding a metallic flake to said mixture.

24. A coating composition comprising an aqueous dispersion of $C_2$–$C_4$ esters of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7; pigments; and resins.

25. The coating composition of claim 24 further comprising one or more coatings additives selected from the group consisting of leveling, flow control agents and rheology modifiers; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

26. The coating composition of claim 24 wherein said resin is selected from the group consisting of polyesters, polyester-amides, cellulose esters, alkyds, polyurethanes, epoxy resins, polyamides, acrylics, vinyl polymers, polyurethanes, and melamines.

27. A high solids organic coating composition having a solids contents of at least 35% comprising an organic solution of $C_2$–$C_4$ esters of carboxy ($C_1$–$C_3$ alkyl) cellulose having an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7; and resin.

28. The high solids composition of claim 27 wherein said resin is selected from the group consisting of acrylic, polyester, isocyanate, polyurethane, melamine, urea formaldehyde resins, and mixtures thereof.

* * * * *